July 27, 1926.

T. P. KIRKPATRICK

SQUIRREL CAGE MOTOR

Filed Oct. 24, 1922

1,594,205

WITNESSES:

INVENTOR
Thomas P. Kirkpatrick,
BY
ATTORNEY

Patented July 27, 1926.

1,594,205

UNITED STATES PATENT OFFICE.

THOMAS P. KIRKPATRICK, OF WILKINSBURG, PENNSYLVANIA, ASSIGNOR TO WESTINGHOUSE ELECTRIC & MANUFACTURING COMPANY, A CORPORATION OF PENNSYLVANIA.

SQUIRREL-CAGE MOTOR.

Application filed October 24, 1922. Serial No. 596,590.

My invention relates to squirrel-cage motors and it has particular relation to improvements in the resistance rings or end rings which connect the ends of the armature inductor-bars.

In high-speed squirrel-cage motors requiring low-resistance end rings, difficulty has been experienced in securing the requisite high conductivity together with the high tensile strength required to meet the centrifugal forces. Alloys of high conductivity are principally copper and therefore weak. Bronze and other common materials of high tensile strength have poor conductivity, and hence would require too large a cross-section.

The principal object of my invention, therefore, is to provide a composite ring of bronze and copper which shall have the requisite tensile strength and conductivity without unduly increasing the cross-section.

Figure 1:
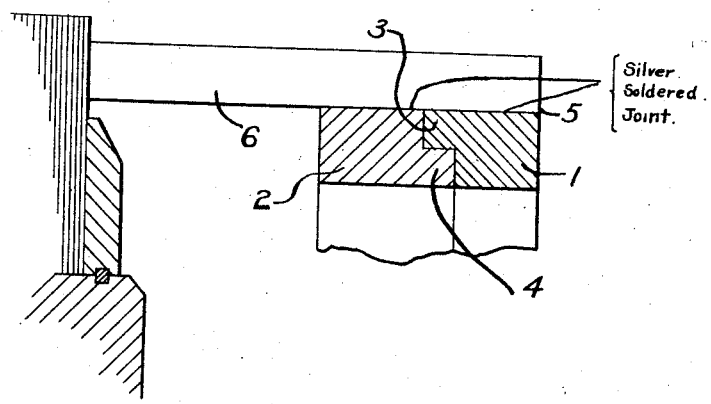
Figure 2:
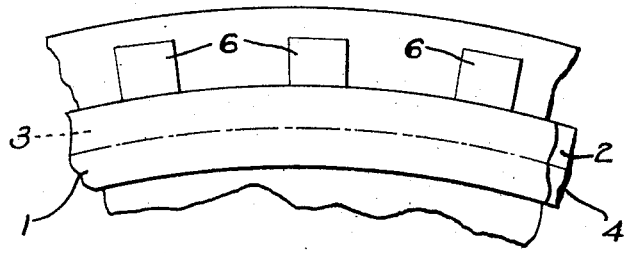

Other objects of my invention, as well as details of the construction thereof, will be apparent from the following description and claims in conjunction with the accompanying drawing, wherein:

Figure 1 is a fragmentary longitudinal sectional view of a squirrel-cage motor member constructed in accordance with my invention, the end ring being shown in section, and Fig. 2 is a view in end elevation showing a fragmentary part of the end ring member and attending parts.

As shown in the drawing, my composite end-ring member comprises two interconnected annular sections 1 and 2, respectively, of like diameters, disposed in side-by-side relation and constituting a single ring. One of the sections, as 1, which is preferably of bronze, possesses a high tensile strength, and is preferably provided with a flange 3 which overlies a flange 4 on the other section 2. The section 2 is preferably of copper, possessing a high degree of conductivity while having a relatively low elastic limit. The end-ring sections 1 and 2 are connected, by silver solder 5, or other means, to the inductor bars 6 of the rotor. The two sections, when so lapped or interconnected to form a tight joint therebetween, constitute the complete resistance ring.

In practice, it will be readily apparent that, when the rotor is rotating at the required high speed, any strain produced in the section 2, due to centrifugal force, will be exerted against the seat 3 of the ring member 1 having high tensile strength. The section 1 thus takes up all strain so induced by the centrifugal force.

While I have shown and described a certain embodiment of my invention, changes in form and in the particular arrangement of its parts may be made within the scope of the invention. I desire, therefore, that the disclosed embodiment shall be regarded as illustrative only, and that the appended claims shall be accorded the broadest construction consistent with the prior art.

I claim as my invention:

1. In a squirrel-cage motor, the combination with the cage bars, of an end ring connected thereto, said ring being formed of two annular and interconnected members of dissimilar metals, one of which is adapted to take up the strain, said annular members lying in side-by-side relation and having angular cross-sections to provide overlapping flanges.

2. In a squirrel-cage motor, the combination with the cage bars, of an end ring connected thereto, said ring being formed of two annular and interconnected sections, one section being of high conductivity and the other of high tensile strength, the former section being of angular cross-section to provide a flange underlying a portion of the latter section.

3. An end ring for squirrel-cage motors, comprising two annular interconnected conductor sections of dissimilar materials, one of greater tensile strength than the other being laterally keyed to the other to take up the centrifugal stresses.

4. An end ring for squirrel-cage motors, comprising two annular sections disposed side by side and having integral overlapping portions, the outer section being adapted to take up the stresses.

5. An end ring for squirrel-cage motors, comprising two annular sections disposed in side-by-side relation, one of a material having higher conductivity than the other, the one of less conductivity having an overlapping connection to the other and adapted to take up the stresses.

6. An end ring for squirrel-cage motors, comprising two connected annular sections disposed side by side with one overlapping the other, one having a higher conductivity than the other, the one of less conductivity being adapted to take up the stresses.

7. In an electric machine, a squirrel-cage secondary member having a plurality of armature inductor bars, end rings of high conductivity but low tensile strength electrically connected to the ends thereof, and a reinforcing annular member of greater tensile strength having an overhanging flange laterally connected to each end ring for taking up the centrifugal stresses.

8. In an electric machine, a squirrel-cage secondary member having a plurality of armature inductor bars, an end ring of high conductivity but low tensile strength electrically connected to the ends thereof, and a reinforcing ring of greater tensile strength mechanically connected to each end ring and to said inductor-bar ends.

9. In an electric machine, a squirrel-cage secondary member having a plurality of armature inductor bars, an end ring of high conductivity but low tensile strength electrically connected to the ends thereof, and a reinforcing conducting ring of less electrical conductivity but greater mechanical strength mechanically connected to each end ring and electrically connected to said inductor-bar ends.

In testimony whereof, I have hereunto subscribed my name this 13th day of October, 1922.

THOMAS P. KIRKPATRICK.